(12) United States Patent
Fu

(10) Patent No.: US 11,910,053 B2
(45) Date of Patent: Feb. 20, 2024

(54) SPREAD CHANNEL MULTI-CDN STREAMING

(71) Applicant: NBCUNIVERSAL MEDIA, LLC, Universal City, CA (US)

(72) Inventor: Qiang Fu, Universal City, CA (US)

(73) Assignee: NBCUNIVERSAL MEDIA, LLC, Universal City, CA (US)

( * ) Notice: Subject to any disclaimer, the term of this patent is extended or adjusted under 35 U.S.C. 154(b) by 0 days.

(21) Appl. No.: 17/644,752

(22) Filed: Dec. 16, 2021

(65) Prior Publication Data

US 2023/0199247 A1 Jun. 22, 2023

(51) Int. Cl.
| | |
|---|---|
| *H04N 21/437* | (2011.01) |
| *H04L 67/60* | (2022.01) |
| *H04N 21/433* | (2011.01) |
| *H04N 21/442* | (2011.01) |
| *H04N 21/61* | (2011.01) |
| *H04N 21/845* | (2011.01) |

(52) U.S. Cl.
CPC .......... *H04N 21/437* (2013.01); *H04L 67/60* (2022.05); *H04N 21/4331* (2013.01); *H04N 21/44209* (2013.01); *H04N 21/6175* (2013.01); *H04N 21/8456* (2013.01)

(58) Field of Classification Search
CPC ............. H04N 21/437; H04N 21/4331; H04N 21/44209; H04N 21/6175; H04N 21/8456; H04L 67/60
See application file for complete search history.

(56) References Cited

U.S. PATENT DOCUMENTS

| | | | | |
|---|---|---|---|---|
| 2004/0117455 | A1* | 6/2004 | Kaminsky | ............... H04L 69/14 709/219 |
| 2010/0042675 | A1* | 2/2010 | Fujii | ...................... G06F 9/505 709/203 |
| 2010/0095013 | A1* | 4/2010 | Zuckerman | ......... H04L 67/1008 709/231 |

(Continued)

OTHER PUBLICATIONS

European Patent Office Application Serial No. 22210355.8, Search Report dated Mar. 29, 2023, 8 pages.

*Primary Examiner* — Michael A Keller
*Assistant Examiner* — Thao D Duong
(74) *Attorney, Agent, or Firm* — LEE, HONG, DEGERMAN, KANG & WAIMEY

(57) ABSTRACT

Traditional streaming sequentially downloads content fragments one by one from one CDN. The disclosed streaming method concurrently downloads content fragments from multiple CDNs. It first creates a sequence of bundles of fragments, and then downloads a subsequent bundle by spreading requests to download the fragments within the bundle to multiple CDNs simultaneously with each CDN acting as a channel to download a different fragment. Depending on business needs, various request dispatching strategies can be deployed. When there is a volume based pricing contract with a CDN, a dispatch strategy is to send more requests to the CDN in order to reach contract volume therefore reduce unit cost. Another strategy is to send the request for the earliest fragment to the fastest CDN in order to reduce latency and possibility of buffer underrun. Fault tolerance can be provided by re-routing a request failed at a CDN to another CDN.

17 Claims, 8 Drawing Sheets

(56) References Cited

U.S. PATENT DOCUMENTS

| | | | |
|---|---|---|---|
| 2010/0306373 A1* | 12/2010 | Wormley | H04L 67/1012 |
| | | | 709/224 |
| 2012/0265892 A1* | 10/2012 | Ma | H04N 21/23418 |
| | | | 709/231 |
| 2014/0101294 A1* | 4/2014 | Li | H04L 67/04 |
| | | | 709/219 |
| 2015/0113157 A1* | 4/2015 | Chan | H04N 21/23439 |
| | | | 709/231 |
| 2016/0294933 A1* | 10/2016 | Hong | H04L 65/1069 |
| 2017/0180470 A1* | 6/2017 | Zhang | H04L 67/1074 |
| 2018/0288114 A1* | 10/2018 | Liu | H04N 21/2402 |
| 2019/0238390 A1 | 8/2019 | Martin et al. | |
| 2019/0340125 A1* | 11/2019 | Mondello | G11C 29/824 |
| 2022/0121556 A1* | 4/2022 | Guim Bernat | G06F 11/3636 |
| 2022/0180961 A1* | 6/2022 | Su | G11C 29/42 |

\* cited by examiner

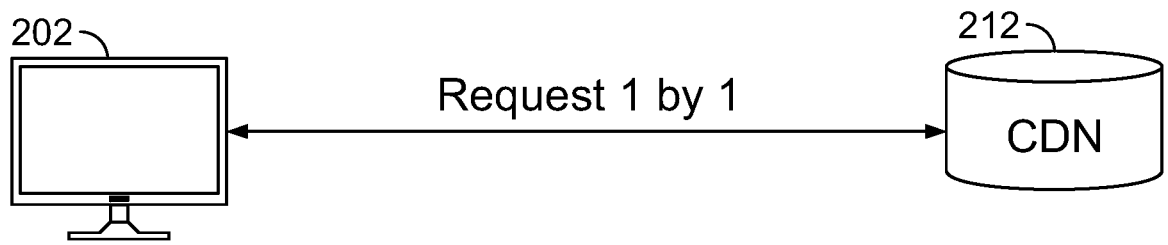
FIG. 2
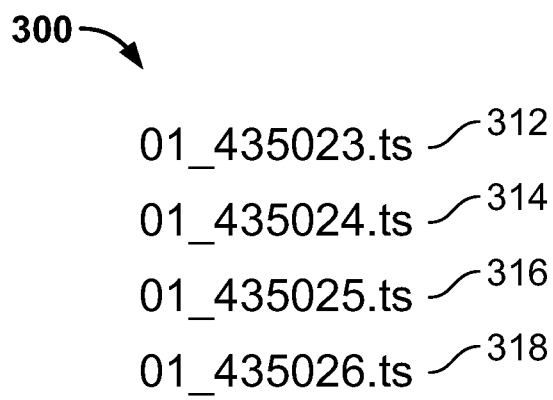
01_435023.ts /312
01_435024.ts /314
01_435025.ts /316
01_435026.ts /318
FIG. 3A
| | |
|---|---|
| Program Information | 352 |
| Representation | 354-1 |
| Representation | 354-2 |
| Representation | 356 |
FIG. 3B

SPREAD CHANNEL MULTI-CDN STREAMING

BACKGROUND

A content distribution network (CDN) is a geographically distributed group of servers (or proxy servers) that work together to deliver Internet content to end users. Examples of such Internet content include web objects (for example, text, graphics, scripts), downloadable objects (for example, media files, software, documents), applications (for example, e-commerce, portals), live streaming media, on-demand streaming media, and social media sites.

Content owners such as media companies and e-commerce vendors pay a CDN operator to deliver their content to end users. For example, in the context of on-demand streaming media, media files may be cached at one or more servers of a CDN, each server located at a respective geographical location or point of presence (PoP). In response to an end user requesting streaming of particular media content, the CDN may identify a server on its network to service the request. Typically, the identified server is the server that is geographically closest to the location of the end user in order to achieve faster delivering speed. The identified server then delivers the media content to the end user.

SUMMARY

When streaming of media content is serviced by a single CDN, it is the single CDN that delivers corresponding media files to a streaming device (for example, a multimedia player or video player) that is used by the end user. High traffic or other bandwidth related issues that may affect the performance of the single CDN could adversely affect the quality of the media stream and/or increase latency.

Aspects disclosed herein are directed toward providing a higher degree of stability in the delivery of streaming media content (for example, on-demand streaming media content). For example, one or more aspects are directed toward: decreasing latency to improve response during start-up and trick play (which provides visual feedback during playback operations such as seek, forward, and rewind); and/or increasing a degree of fault tolerance with respect to CDN service outage and/or temporary network congestion at a CDN provider. Also, one or more aspects are directed toward utilizing CDN services in a more cost-effective manner.

According to at least one embodiment, a method for streaming multimedia content by a streaming device includes: sending a first request to a first content distribution network (CDN) of a plurality of CDNs, the first request for requesting download of a first segment of the multimedia content for streaming by the streaming device; and sending a second request to a second CDN of the plurality of CDNs, the second request for requesting download of a second segment of the multimedia content. The method also includes: storing the first segment in response to receiving the first segment from the first CDN; and storing the second segment in response to receiving the second segment from the second CDN.

According to at least one embodiment, a machine-readable non-transitory medium has stored thereon machine-executable instructions for streaming multimedia content by a streaming device. The instructions include: sending a first request to a first content distribution network (CDN) of a plurality of CDNs, the first request for requesting download of a first segment of the multimedia content for streaming by the streaming device; sending a second request to a second CDN of the plurality of CDNs, the second request for requesting download of a second segment of the multimedia content for streaming by the streaming device; storing the first segment in response to receiving the first segment from the first CDN; and storing the second segment in response to receiving the second segment from the second CDN.

According to at least one embodiment, an apparatus for streaming multimedia content includes a network communication unit configured to transmit and receive data. The apparatus further includes one or more controllers configured to: send a first request to a first content distribution network (CDN) of a plurality of CDNs, the first request for requesting download of a first segment of the multimedia content for streaming by the streaming device; send a second request to a second CDN of the plurality of CDNs, the second request for requesting download of a second segment of the multimedia content for streaming by the streaming device; store the first segment in response to receiving the first segment from the first CDN; and store the second segment in response to receiving the second segment from the second CDN.

BRIEF DESCRIPTION OF THE DRAWINGS

The above and other aspects and features of the present disclosure will become more apparent upon consideration of the following description of embodiments, taken in conjunction with the accompanying drawing figures.

FIG. 2 illustrates an example distribution of content using a single content distribution network (CDN).

FIG. 3A illustrates a portion of an example manifest.

FIG. 3B illustrates a portion of another example manifest.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

Embodiments of the present invention relate to a system and method for streaming multimedia content, for example, from a plurality of content distribution networks (CDNs). The term "distribution" will be used broadly to include various delivery methods of content, including air, cable, satellite, Internet, wireless, and other platforms known in the art, and shall not be limited to a particular technology or platform. One of ordinary skill in the art will appreciate that this disclosure is not to be limited to this list, or the following discussion, and is applicable to various other formats, medium, platforms, and distribution channels known to those skilled in the art.

Figure 1A:
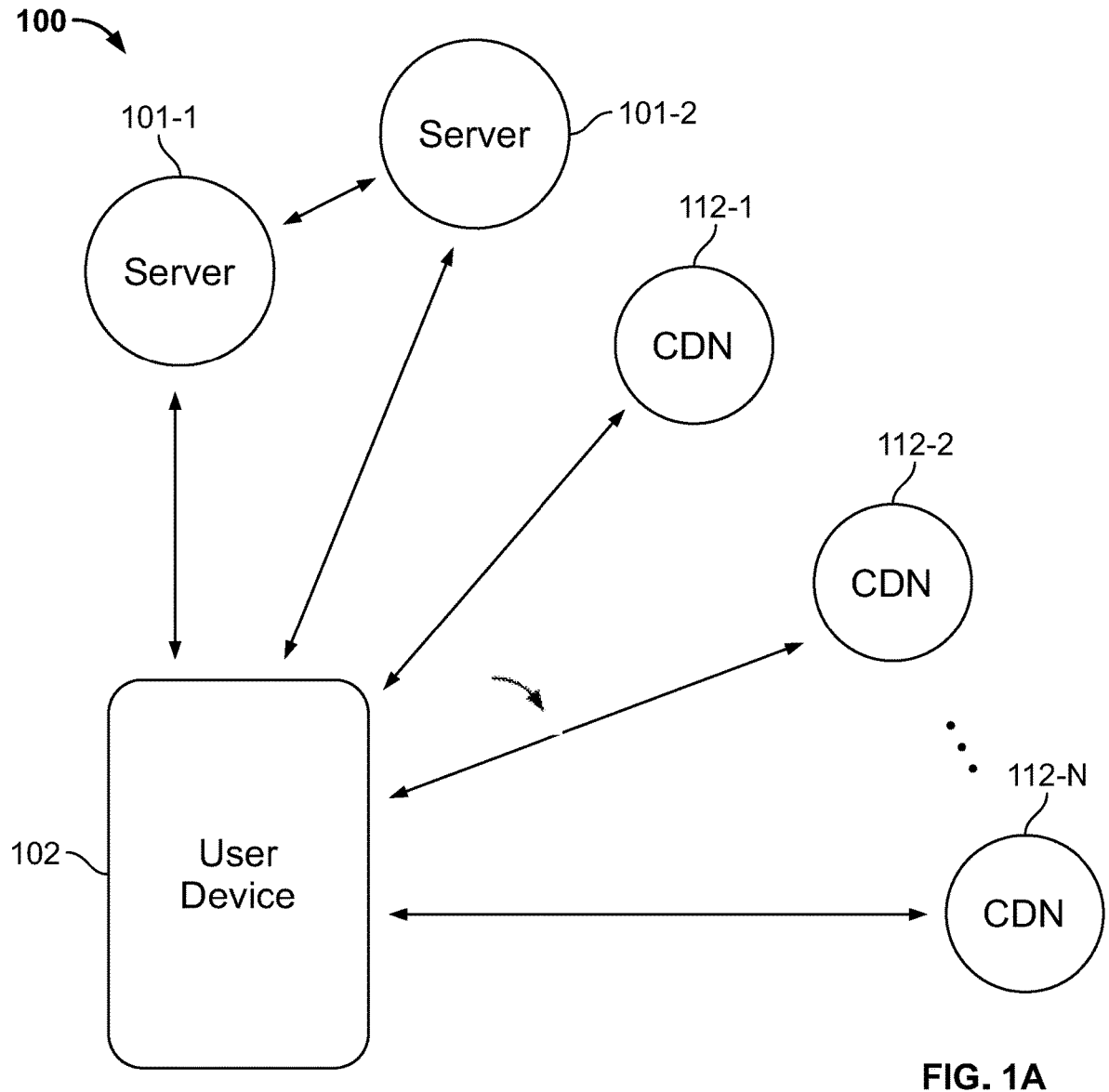
FIG. 1A illustrates an environment in which multimedia content is distributed.

FIG. 1A illustrates an environment 100 in which multimedia content (for example, audio and/or video content) is distributed. In the environment 100, a user device 102 issues requests for presentation of the content. Such requests are received and handled (or processed). FIG. 1A will be discussed with respect to content that is suitable for delivery by streaming, etc. However, this disclosure is not to be limited thereto, and it will be understood by those of ordinary skill in the art that the features discussed herein are applicable to numerous other applications, platforms, and content delivery methods well known by those of ordinary skill in the art.

For example, requests issued by the user device 102 may be received and handled by server 101-1 and/or 101-2. Each server 101-1, 101-2 is configured to handle requests for media files and to facilitate transmission of media files to requesting parties. The server 101-1, 101—may belong to (or be operated by) a corresponding content owner. As illustrated in FIG. 1A, the server 101-1, 101-2 may be in communication with the user device 102 via a network.

Such a network may include various systems for distribution of content including any desired combination of hardwired and wireless communication links, including wide area networks (WAN), local area networks (LAN), wireless networks suitable for packet-type communications, over-the-air, cable, Internet, other network connection systems, etc., which implement networks and hardware known and used in the related art, including broadcast technologies, cable or satellite distribution systems, Internet protocol (IP), or other networked technologies, etc. Examples of the content include live and recorded television, movies, Internet streaming video and audio, music, radio or other audio-visual content, and the like. The environment 100 may also employ a gateway (not depicted), for example, a server, a router, a firewall server, a host, a proxy server, request redirector, etc.

The server 101-1, 101-2 may be configured to receive requests from the user device 102 for media content and provide information to the user device 102 in response to the request. The information may include data associated with the encoded media content or address information for retrieving files of the encoded media content. It will be understood that the server 101-1, 101-2 may be configured to provide information, data, and media content other than video, including audio, text, metadata, etc.

For example, the server 101-1, 101-2 may be an enterprise server, a web server, a media server, a mobile data server, or any other type of server. In some embodiments, the server 101-1, 101-2 may be a computer or a computer program responsible for accepting requests (for example, HTTP, RTSP, or other protocols that can initiate a media session) from the user device 102 and serving the user device 102 with streaming media. Although not shown in FIG. 1A, embodiments are considered in which the user device 102 is configured to transmit and receive data directly to and from a separate web server, which in turn transmits and receives data transmissions to and from the server 101-1, 101-2 via a network.

The user device 102 may be a hardware component including software code and applications that are configured to allow the client terminal to communicate, transmit, request, and receive data packets, which may correspond to streaming media data, via a network. The user device 102 may include any terminal or system configured to receive a content signal, and, in some embodiments, the user device 102 may be configured to decode received encoded media files and prepare the content for presentation to a user via an output device such as a display. The output device may be implemented in the same hardware as the user device 102, or, in some embodiments, the output device may be implemented in a separate hardware or location from the user device 102 and be otherwise coupled and/or associated with the user device, such as by wired connection or wireless communication (for example, by wireless broadcast).

For example, the user device 102 may correspond to an Internet video streaming device, which is configured to request, transmit, and receive data packets corresponding to Internet streaming video, and the client terminal may be further configured to decode received data packets and prepare the media content to be displayed via a separate output, such as a television. In some embodiments, the user device 102 may also be configured to transmit information to one or more other aspects of the environment 100 via a network, regarding the content data received and decoded by the user device 102. Various other embodiments of the user device 102 may include televisions, desktop computers, laptop computers, tablet computers, mobile smartphones, personal media devices, wearable devices, set top box receivers, streaming Internet content devices, satellite television receivers, etc. In other embodiments, the user device 102 may be implemented in more than one connected device.

In an embodiment, the user device 102 may request, retrieve, and/or receive particular content from the server 101-1, 101-2 via a network. The request, retrieval, and/or the receiving of the particular content may correspond to a user of a client terminal selecting a particular piece(s) of content, entering a particular URL or address at the client terminal, or utilizing a content provider-specific application that is configured to connect to the server 101-1, 101-2 to transmit and receive instructions or requests for retrieval of specific content items. In some embodiments, the server 101-1, 101-2 may be configured to provide the user device 102 with a single or multiple encoding streams of information, including audio/video content, as well as data associated with the audio/video content, such as metadata.

Similarly, requests issued by the user device 102 may be received and handled by content distribution network (CDN) 112-1, 112-3 and/or 112-N.

Figure 1B:
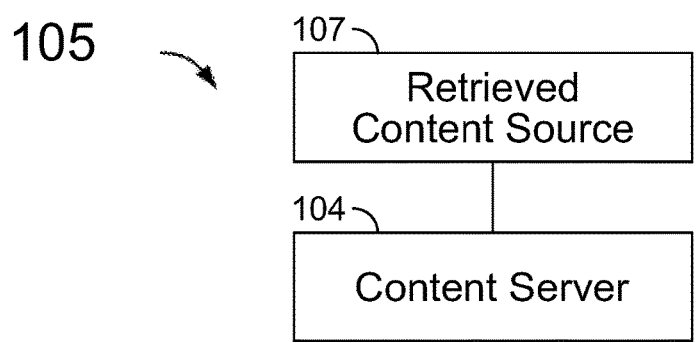
FIG. 1B is a block diagram of a CDN according to at least one embodiment.

FIG. 1B is a block diagram of a CDN 105 according to at least one embodiment. The CDN 105 may correspond CDN 112-1, 112-3 and/or 112-N of FIG. 1A. Encoded media files may be stored at retrieved content source 107 from which such files may later be retrieved. In other embodiments, the encoded media files may be stored in a database external to the CDN 105, and the content retrieved content source 107 may be configured to store pointers or path descriptions for querying and/or requesting the encoded media files from the external database for later retrieval.

In some embodiments, the encoded files may correspond to commonly known compressed or uncompressed file formats including MPEG-1, MPEG-2, MPEG-4, H.264, AVC, DV, DVCAM, AVI, ASF, MOV, WMV, etc. However, it is understood that this disclosure is not limited thereto, and that numerous other compressions and formats may be utilized.

According to at least one embodiment, the encoded media files may be stored in the retrieved content source 107 along with metadata associated with the media files, including encoding metadata, closed captioning information, etc. For example, the metadata may describe thematic elements, underlying subject matter, and other data.

The files stored in the retrieved content source 107 may be distributed by the content server 104. The content server 104 may include a plurality of content servers, each configured to handle requests for media files and to facilitate transmission of media files to requesting parties. The content server 104 may be in communication with a device (for example, user device 102) via a network.

The content server 104 may be configured to receive requests from the user device 102 for media content and provide information to the user device in response to the request. The information may include data associated with the encoded media content or address information for retrieving files of the encoded media content. It will be understood that content server 104 may be configured to provide information, data, and media content other than video, including audio, text, metadata, etc.

For example, content server 104 may be an enterprise server, a web server, a media server, a mobile data server, or any other type of server. In some embodiments, the content server 104 may be a computer or a computer program responsible for accepting requests (for example, HTTP, RTSP, or other protocols that can initiate a media session) from the user device 102 and serving the user device with streaming media. Embodiments are considered in which the user device 102 is configured to transmit and receive data directly to and from a separate web server, which in turn transmits and receives data transmissions to and from the content server 104 via a network.

As described earlier, each of one or more servers of a CDN (for example, CDN 105) may be located at a respective geographical location or point of presence (PoP). In response to an end user requesting streaming of particular media content, the CDN 105 may identify a server on its network to service the request. Typically, the identified server is the server that is geographically closest to the location of the end user. The identified server then delivers the media content to the end user.

FIG. 2 illustrates an example distribution of multimedia content using a single content CDN 212. The CDN 212 may be similar to (or include a system similar to) the CDN 112-1, 112-2, . . . , 112-N of FIG. 1A and/or the CDN 105 of FIG. 1B. In the example of FIG. 2, an end user may view content (for example, multimedia content) via a streaming device 202 (for example, user device 102 of FIG. 1A). To achieve the streaming, the streaming device 212 sends requests for segments (or fragments) of the content to the CDN 212.

The manifest may include information on a location where each encoding data file is available such as an address, a link, or another pointer to a location where the encoding file can be retrieved. In one or more embodiments, the manifest may further include various metadata related to the encoded media content, such as event information, media type, aspect ratios, codec information, and the like. In some embodiments, the manifest may be provided in the form of an XML file. In some embodiments, the manifest may be provided in the form of an HTTP Live Streaming (HLS) file. However, it is understood that various implementations and file types (such as other text files) may also be used.

FIG. 3A illustrates a portion of an example manifest 300 that is in the form of an HLS file. HLS is an HTTP-based adaptive bitrate streaming communications protocol. Based on standard HTTP transactions, HLS allows content to be offered from conventional HTTP servers and to be delivered over HTTP-based content delivery networks. HLS involves segmenting an overall stream into a sequence of smaller HTTP-based file download segments, each download segment loading a short (or shorter) video that is, for example, 1 to 10 seconds in length.

The manifest 300 corresponds to multimedia content and includes information for segments (or fragments) that make up the multimedia content. For example, each segment may include 5 MB of data to provide approximately 4 seconds of high-definition (HD) content (or HDX content). In such a situation, a one-hour-long piece of multimedia content may be segmented into 900 four-second segments.

The portion of the manifest illustrated in FIG. 3A sequentially lists segments 312, 314, 316, 318 of the media content. Each segment may be a file that ends with a suffix of .ts (indicating an MPEG transport stream). The segments are usually numbered sequentially in the order in which they are to be displayed for a viewer or end user.

FIG. 3B illustrates portions of another example manifest 350. Similar to the manifest 300 of FIG. 3A, the manifest 350 lists different representations for multimedia content.

The manifest 350 first includes program information 352. The program information 352 includes a total duration of the multimedia content (for example, 2 hours, 21 minutes and 31 seconds).

The manifest 350 also includes information regarding different representations for the multimedia content.

For example, the information regarding representation 354-1 corresponds to a first combination of height and width (for example, a height of 1080 and a width of 1920). Similarly, the information regarding representation 354-2 corresponds to a second combination of height and width (for example, a height of 480 and a width of 853).

For each representation 354-1, 354-2, the information provides a multimedia player (for example, user device 102) with information regarding how an initial segment is to be retrieved, and also how sequential segments are to be retrieved (for example, the times at which each successive segment is to be presented). For example, a range of segments may be provided.

As described, different representations may correspond to different combinations of height and width. It is understood that different representations may, alternatively or additionally, correspond to other parameters (for example, audio sampling rate, streaming bitrate, etc.)

For example, the information regarding representation 356 corresponds to an audio sampling rate of 48 kHz. Similar to the information described earlier with reference to representations 354-1, 354-2, the information regarding representation 356 may provide a multimedia player (for example, user device 102) with information regarding how an initial segment is to be retrieved, and also how sequential segments are to be retrieved (for example, the times at which each successive segment is to be presented). For example, a range of segments may be provided.

Referring to FIG. 2, as described earlier, the requests that are sent by the streaming device 202 may be issued based on a manifest. For purposes of illustration, such requests will be described with reference to the portion of the manifest 300 illustrated in FIG. 3A. For example, at a first time $t_1$, the streaming device 202 sends, to the CDN 212, a request for download of the segment 312. At a second time $t_2$ following $t_1$, the streaming device 202 sends, to the CDN 212, a request for download of the segment 314. At a third time $t_3$ following $t_2$, the streaming device 202 sends, to the CDN 212, a request for download of the segment 316. At a fourth time $t_4$ following $t_3$, the streaming device 202 sends, to the CDN 212, a request for download of the segment 318.

In response to the respective requests, the CDN 212 sends the segments 312, 314, 316, 318 to the streaming device 202. Various factors such as high traffic or other bandwidth-related issues experienced at the CDN 212 may adversely affect the quality of the media stream and/or increase latency.

With respect to various embodiments disclosed herein, features and/or techniques are described for increasing a degree of stability in the delivery of streaming media content (for example, on-demand streaming media content).

Aspects of this disclosure are directed to facilitating a spread channel multi-CDN streaming mode. For example, when an end user requests that content be streamed via a streaming device, two or more CDNs are employed, where each CDN may be considered as an individual communication channel. In this regard, the streaming device may send requests for segments (or fragments) of the media content to the CDNs.

Figure 4A:
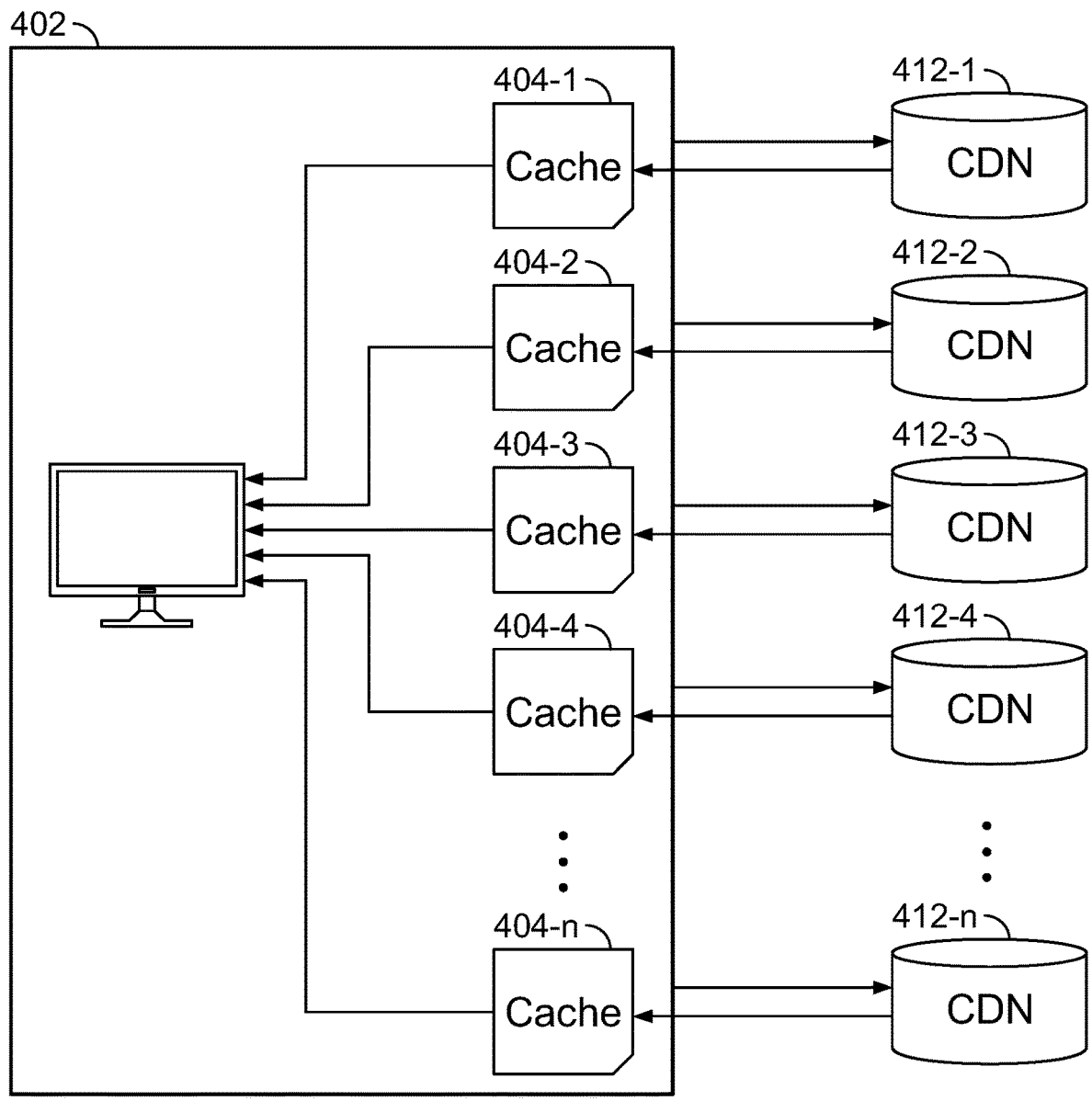
FIG. 4A illustrates an example distribution of content using two or more CDNs according to at least one embodiment.

FIG. 4A illustrates an example distribution of content using two or more CDNs according to at least one embodiment. It is understood that the CDNs used are available in that the content that is to be streamed for display is available at (or to) each of the CDNs. As illustrated in the example of FIG. 4A, CDNs 412-1, 412-2, 412-3, 412-4, ..., 412-$n$ may be used.

According to at least one embodiment, a streaming device 402 may send a batch of requests to the CDNs. For purposes of illustration, the sending of a batch of 4 individual requests will be described. At a first time $t_1$, the streaming device 402 sequentially sends 4 individual requests, each request corresponding to a respective CDN. For example, with reference also to the example manifest 300 of FIG. 3A, the streaming device 402 sends, to the CDN 412-1, a request for download of segment 312. Then, the streaming device 402 sends, to the CDN 412-2, a request for download of segment 314. Then, the streaming device 402 sends, to the CDN 412-3, a request for download of segment 316. Then, the streaming device 402 sends, to the CDN 412-4, a request for download of segment 318. The streaming device 402 can also spawn 4 threads to send requests simultaneously. For example, thread 1 sent to the CDN 412-1 is a request to download segment 312. Thread 2 sent to the CDN 412-2 is a request to download segment 314. Thread 3 sent to the CDN 412-3 is a request to download segment 316. Thread 4 sent to the CDN 412-4 is a request to download segment 318. In this manner, according to at least one embodiment, a batch of 4 individual requests is sent by the streaming device 402. One of benefits of simultaneously sending batch requests is to reduce latency, achieve faster response, react to and workaround network problems more quickly. The requests will be routed from a router in local area network (LAN) to the first router on wide area network (WAN), which usually belongs to the high-speed Internet backbone. The request might go through more WAN routers before reaching CDNs. Compared to the traditional process of sending a request, waiting for and receiving the response, and then sending subsequent requests, with the batch request approach, responses from multiple CDNs will arrive at the first WAN router shortly one after another. Therefore with a batch of simultaneous N requests to N CDNs, the wait time for N−1 requests is essentially eliminated. With much less waiting time, a user's network bandwidth will be better utilized, so the user can reduce the possibility of buffer underrun to achieve better viewing experience, and have better video quality as more data can be downloaded in the same amount of time. Instead of not being able to discover a delivery problem with a CDN until a request is sent to the CDN sequentially, the problem will be detected more quickly, and the request for the same content fragment will be re-routed to another CDN swiftly with the batch request approach. Therefore, fault tolerance is achieved without degrading quality of streaming service. To avoid overwhelming CDNs with rapidly downloading all content fragments continuously, and to allow other users be serviced in timely fashion, requests may be paused after the buffer is full.

According to at least one embodiment, the CDNs 412-1, 412-2, 412-3, 412-4 are selected (for example, from among all available CDNs) by the streaming device 402 based on (earlier) download speed performance. For example, prior to sending the requests described in the above paragraph, the download speed performance of each of multiple CDNs including CDNs 412-1, 412-2, 412-3, 412-4 was measured. The measurement may be performed by the streaming device 402, for example, based on an amount of data that was downloaded and the corresponding length of time required for the download to be completed.

Based on the measured performance, the streaming device 402 may rank the CDNs, for example, from fastest to slowest. For example, the streaming device 402 may determine the following ranked sequence: CDN 412-1, CDN 412-2, CDN 412-3, CDN 412-4, ..., 412-$n$, where it was determined that CDN 412-1 offers the fastest download speed, and that CDN 412-$n$ offers the slowest download speed. Accordingly, in the example situation that was described earlier with reference to FIGS. 3A and 4A, the segment that is ultimately displayed at the earliest time (i.e., segment 312) is requested from the CDN with the fastest download speed—the CDN 412-1. Also accordingly, the segment that is ultimately displayed at the next earliest time (i.e., segment 314) is requested from the CDN with the second fastest download speed—the CDN 412-2, and so on. Consequently, following the above analysis, the latency of all CDNs is reduced to a shortened latency associated with the fastest CDN for the first request in the batch and is essentially reduced to zero for the remaining requests in the batch.

In response to the described batch of requests, the CDNs send the requested segments to the streaming device 402. By way of example, the segments 312, 314, 316, 318 may be cached (for example, stored in a cache memory 404-1, 404-2, 404-3, 404-4, ..., 404-$n$) by the streaming device 402, such that the segments can be played for viewing by the end user. As shown in FIG. 4A, there may be a one-to-one correspondence of CDNs to caches, or in another embodiment, two or more CDNs may share a single cache such that there are fewer caches in the streaming device 402 than CDNs. The streaming device 402 downloads and plays segments as streaming is conducted. In addition, the streaming device 402 may keep a buffer of segments that it receives in case it loses connection to a network.

According to at least one embodiment, each segment is downloaded from its respective CDN to a respective cache at the streaming device 402. For example, the segment 312 is downloaded from the CDN 412-1 to a cache 404-1. The segment 314 is downloaded from the CDN 412-2 to a cache 404-2. The segment 316 is downloaded from the CDN 412-3 to a cache 404-3. The segment 318 is downloaded from the CDN 412-4 to a cache 404-4. In such a manner, the segments 312, 314, 316, 318 are cached at the streaming device 402. Accordingly, the segments 312, 314, 316, 318 can be retrieved by streaming device 402 at the suitable times required for displaying the segments.

In a manner similar to that described earlier with respect to FIGS. 3A and 4A, the streaming device 402 may send a next batch of requests to the CDNs. For example, at a time following the sending of the previous batch, the streaming device 402 may sequentially send another 4 requests to the CDNs. These requests are for download of another 4 segments (i.e., the 4 segments sequentially following the segment 318 in the manifest 300 of FIG. 3A). The batch of requests may be sent based on the same ranked sequence that was described earlier—i.e., CDN 412-1, CDN 412-2, CDN 412-3, CDN 412-4, . . . , CDN 412-$n$. Alternatively, the batch of requests may be sent based on a different ranked sequence. This different sequence may be rebalanced or rearranged based on the speeds at which the segments 312, 314, 316, 318 were downloaded from CDN 412-1, CDN 412-2, CDN 412-3, CDN 412-4, respectively. For example, if the CDN 412-2 had the fastest download speed, the request from the $5^{th}$ fragment may be sent to the CDN 412-2 instead of the CDN 412-1.

In response to the additional batch of requests described in the above paragraph, the CDNs send the requested segments to the streaming device 402. As such, a spread channel multi-CDN mode of streaming is facilitated, according to embodiments of the present invention. In this regard, each of multiple CDNs (for example, CDN 412-1, CDN 412-2, CDN 412-3, CDN 412-4, . . . , CDN 412-$n$) may be considered as a separate, independent communication channel.

According to at least embodiment, a CDN may be effectively replaced with another CDN during streaming. For example, the streaming device 402 may effectively switch from a first CDN to a second CDN based on determining that the first CDN is not functioning well due to, for example, temporary network congestion. In an aspect, if it is determined that a segment requested from the first CDN (or a portion or packet of the segment) does not arrive within a particular period of time relative to the time at which the request was sent, the streaming device 402 may send, to a different second CDN, a request for download of the same segment. Switching to the second CDN reduces the likelihood that adverse effects such as an under-buffering issue will be noticeable by the end user.

As another example, the streaming device 402 may effectively switch from a first CDN to a second CDN based on detecting an outage at the first CDN. Such an outage may be detected based on monitoring domain name system (DNS) performance. According to at least one embodiment, if an outage at the first CDN is detected, then the streaming device 402 may send, to a different second CDN, a request for download of the segment (or a portion or packet of the segment) that was requested of the first CDN. Accordingly, download requests may be re-routed to other CDN(s), to achieve a streaming that is more seamless from the perspective of the end user.

As described earlier with reference to FIGS. 3A and 4A, the segments 312, 314, 316, 318 may be cached by the streaming device 402 (for example, stored in a cache memory). Because more than one pending request may be pending at a given time, responses (for example, media segments) from different CDNs may be received by the streaming device 402 at different times. Storing the segments in cache allows for such reception of media segments at such different times. Accordingly, when the streaming device 402 requires a particular segment for playing, the streaming device may read the segment from a file cache if the segment is already cached. Otherwise, the streaming device 402 waits for the segment to become available.

With regards to cache memory, the corresponding memory requirements can readily be accommodated by streaming devices that include (or otherwise have access to) sufficient memory storage such as that which is provided by one or more hard drives. Here, it is understood that the size of the file cache can be increased, for example, to store more than one batch of segments. In streaming devices that lack (or lack access to) such memory storage devices, an in-memory file system of a more modest size (for example, around 20 MB) may be implemented to provide memory storage of a certain capacity.

The spread channel multi-CDN streaming mode, as described herein with reference to various embodiments may be employed in order to utilize CDN services in a more cost-effective manner. For example, during a given transaction period, one or more particular CDNs may offer better pricing (for example, reduced pricing) if a target threshold with respect to download volume is reached. By way of example, a particular CDN may offer a more competitive pricing if at least 100 GB of content is downloaded over a given period. In this situation, a streaming device (for example, streaming device 402) may be controlled to send a corresponding percentage of requests to that particular CDN. That percentage of requests is calculated to improve the likelihood that the threshold of 100 GB is met by the end of the transaction period. In an aspect, the streaming device 402 may increase or decrease the percentage of requests directed to a particular CDN depending on whether the threshold still needs to be reached (increase the percentage) or has already been reached (decrease the percentage).

Such information regarding the percentage of requests to be directed to a particular CDN may be included in content metadata that is provided to the user device 102, 402 via a network. For example, for one or more of CDNs 412-1, 412-2, 412-3, 412-4, . . . , 412-$n$, metadata may be provided to indicate (or specify) a respective percentage of requests that are to be sent to that CDN. In at least one embodiment, the streaming device 402 sends requests to that CDN accordingly.

As disclosed earlier with reference to FIG. 4A, the streaming device 402 sends a batch of requests to the CDNs. According to at least one embodiment, the requests are sent to the CDNs by an intermediate layer. This will be described in more detail with reference to FIG. 4B.

Figure 4B:
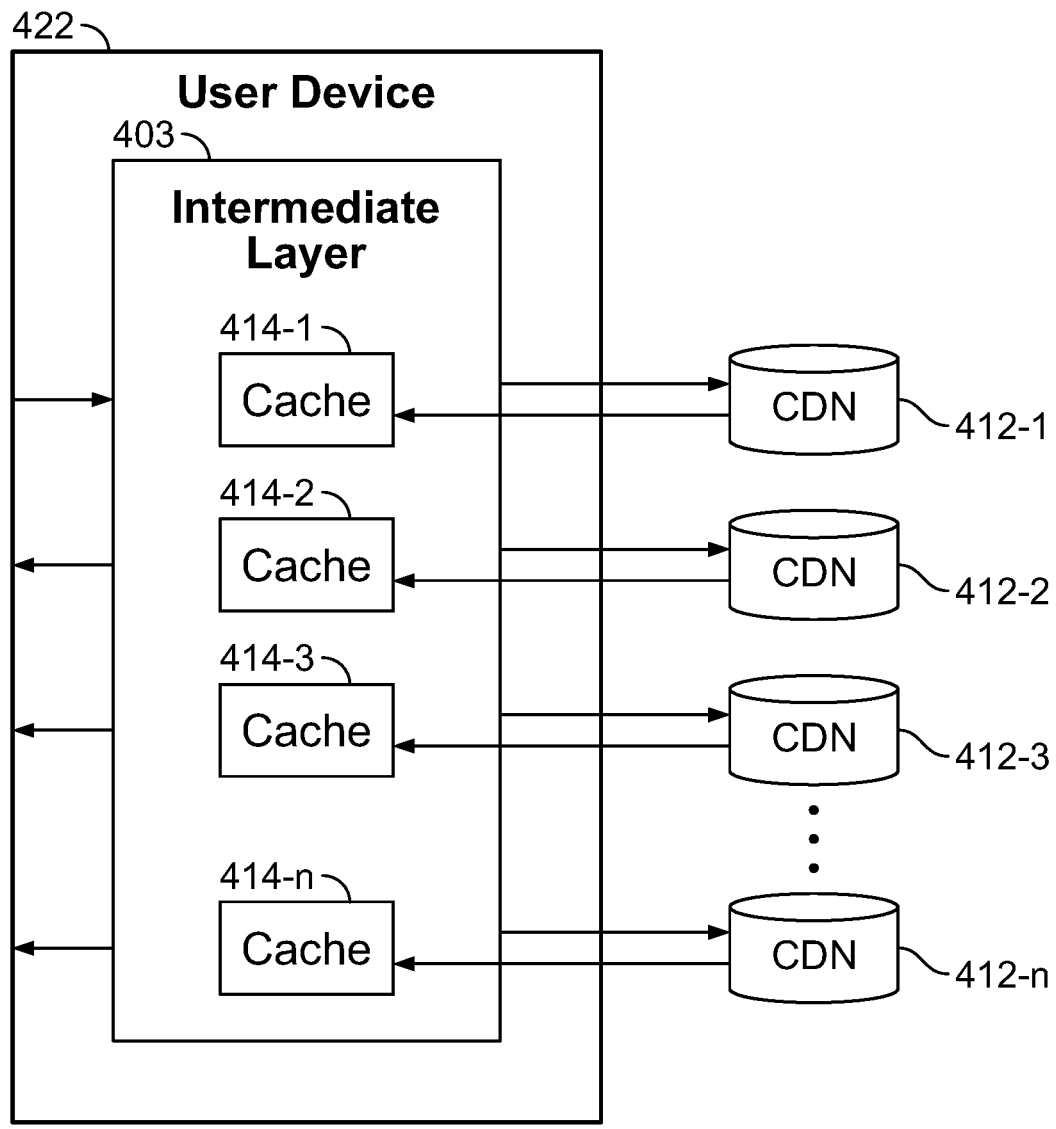
FIG. 4B illustrates an example distribution of content using two or more CDNs according to at least one embodiment.

FIG. 4B illustrates an example distribution of content using two or more CDNs according to at least one embodiment. An intermediate layer 403 may include, for example, add-on software and is configured to operate with existing software that already resides on a particular device (for example, streaming device 422). For example, the intermediate layer 403 may be located at the streaming device 422, such that signaling between the intermediate layer 403 and the streaming 422 may occur via a bus (e.g., bus 803 of FIG. 8). The intermediate layer 403 includes (or includes access to) caches 414-1, 414-2, 414-3, . . . , 414-$n$. As shown in FIG. 4B, there may be a one-to-one correspondence of CDNs to caches, or in another embodiment, two or more CDNs may share a single cache such that there are fewer caches in the intermediate layer 403 than CDNs.

The intermediate layer 403 may perform features that are performed by the streaming device 402, as discussed earlier with reference to FIG. 4A. For purposes of brevity, discussion of such features will not be repeated below. Rather, select differences relative to the embodiment(s) of FIG. 4A will be described in more detail below.

With reference to FIG. 4B, at a streaming device 422, existing software may be configured to send, to a single CDN, requests for download of individual segments. (See, for example, FIG. 2.) However, the existing software may not be configured to send requests to different CDNs. In this situation, software modules that are part of an intermediate layer 403 may be configured to operate with the existing software. For example, the intermediate layer 403 may intercept one or more requests that the existing software sends to a single CDN. By intercepting such a request, the intermediate layer 403 prevents the request from reaching the intended target CDN. In place of the intercepted request, the intermediate layer 403 may send two or more requests to multiple CDNs. After intercepting a request for a content fragment, the intermediate layer 403 first checks if the content fragment is cached or a request for the same fragment has been sent out. if so, the intermediate layer 403 returns the cached response data or waits for the response to come; otherwise the intermediate layer 403 combines it with requests for subsequent fragments according to fragment information in manifest to form a batch of requests, and sends out the requests to multiple CDNs in the same way described above, and therefore achieves the same effect that is achieved by the process illustrated in FIG. 4A. Benefits of this approach include less modification to existing software as most of the operations related to multiple CDNs are isolated in the intermediate layer 403, which simplifies implementation, and promotes easy porting to new software.

For example, with reference to FIG. 4B, the streaming device 422 may, at a first time $t_1$, send a request for segment 312 of FIG. 3A. From the perspective of the streaming device 422, it is intended that this request reach CDN 412-1. This request is received by the intermediate layer 403. The intermediate layer 403 intercepts the request. In place of the intercepted request, the intermediate layer 403 sends two or more requests to multiple CDNs.

According to at least one embodiment, the requests sent by the intermediate layer 403 cover the segment requested by the streaming device 422 (for example, segment 312). In addition, the requests sent by the intermediate layer 403 cover segments immediately following the requested segment (for example, the requests also cover segments 314, 316, 318). For example, the intermediate layer 403 sends, to the CDN 412-1, a request for download of segment 312. Also, the intermediate layer 403 sends, to the CDN 412-2, a request for download of segment 314 and sends, to the CDN 412-3, a request for download of segment 316. In this manner, a batch of 3 individual requests is sent by the intermediate layer 403 in lieu of the request that was received from the streaming device 422.

Based on the requests sent by the intermediate layer 403, each segment is downloaded from its respective CDN to a respective cache at the intermediate layer. For example, the segment 312 is downloaded from the CDN 412-1 to the cache 414-1. The segment 314 is downloaded from the CDN 412-2 to the cache 414-2. The segment 316 is downloaded from the CDN 412-3 to the cache 414-3. In such a manner, the segments 312, 314, 316 are cached at (or by) the intermediate layer 403. The segments 312, 314, 316 may be provided to the streaming device 422 at a suitable time (or times).

For example, as described earlier, the streaming device 422 may have sent, at the first time $t_1$, a request for segment 312. As also described earlier, the segment 312 was downloaded to the cache 414-1. In response to the request sent by the streaming device 422 at the first time $t_1$, the intermediate layer 403 retrieves the segment 312 from the cache 414-1 and provides the segment to the streaming device.

At a second time $t_2$, the streaming device 422 may send a request for segment 314. As described earlier, the segment 314 was downloaded to the cache 414-2. In response to the request sent by the streaming device 422 at the second time $t_2$, the intermediate layer 403 retrieves the segment 314 from the cache 414-2 and provides the segment to the streaming device.

At a third time $t_3$, the streaming device 422 may send a request for segment 316. As described earlier, the segment 316 was downloaded to the cache 414-3. In response to the request sent by the streaming device 422 at the third time $t_3$, the intermediate layer 403 retrieves the segment 316 from the cache 414-3 and provides the segment to the streaming device.

In this manner, actions performed by the intermediate layer 403 with respect to the various CDNs are transparent to the streaming device 422.

Figure 5:
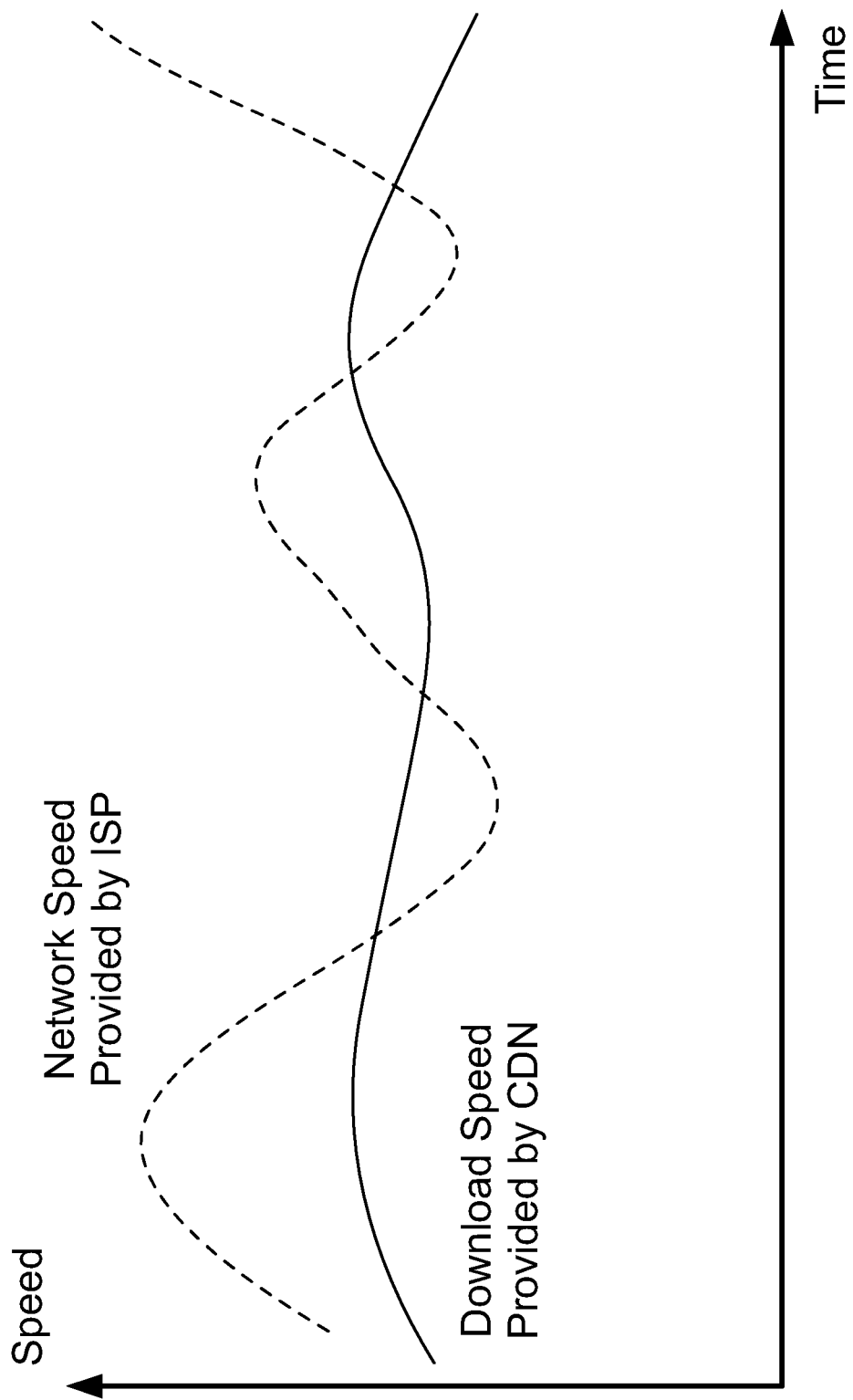
FIG. 5 is a graph illustrating example network and CDN download speeds.

FIG. 5 is a graph illustrating example network and CDN download speeds while streaming content in the manner described with reference to FIG. 2. FIG. 5 illustrates that, during the streaming of multimedia content, the network speed (for example, Internet download speed) that is provided by an Internet service provider (ISP) to an end user varies with respect to time. Similarly, the download speed that is provided by an individual CDN also varies with respect to time.

As illustrated in FIG. 5, over certain periods of time, the network speed (for example, Internet download speed) is faster than the download speed that is provided by an individual CDN. In such a situation, embodiments of the present invention may be employed to better utilize the additional network bandwidth that is available to the user. For example, one or more additional CDNs may be utilized to download the content that is being streamed. Accordingly, the total network bandwidth can be utilized more fully, for example, to fill buffer(s) at the streaming device. When the buffer(s) is filled to a greater degree, the likelihood that buffer underrun will occur is reduced, thereby improving the quality of the streaming. As such, additional bandwidth that otherwise would have gone unused can be utilized, for example, to compensate for other periods when the network speed is slower than the download speed provided by the CDN.

Figure 6:
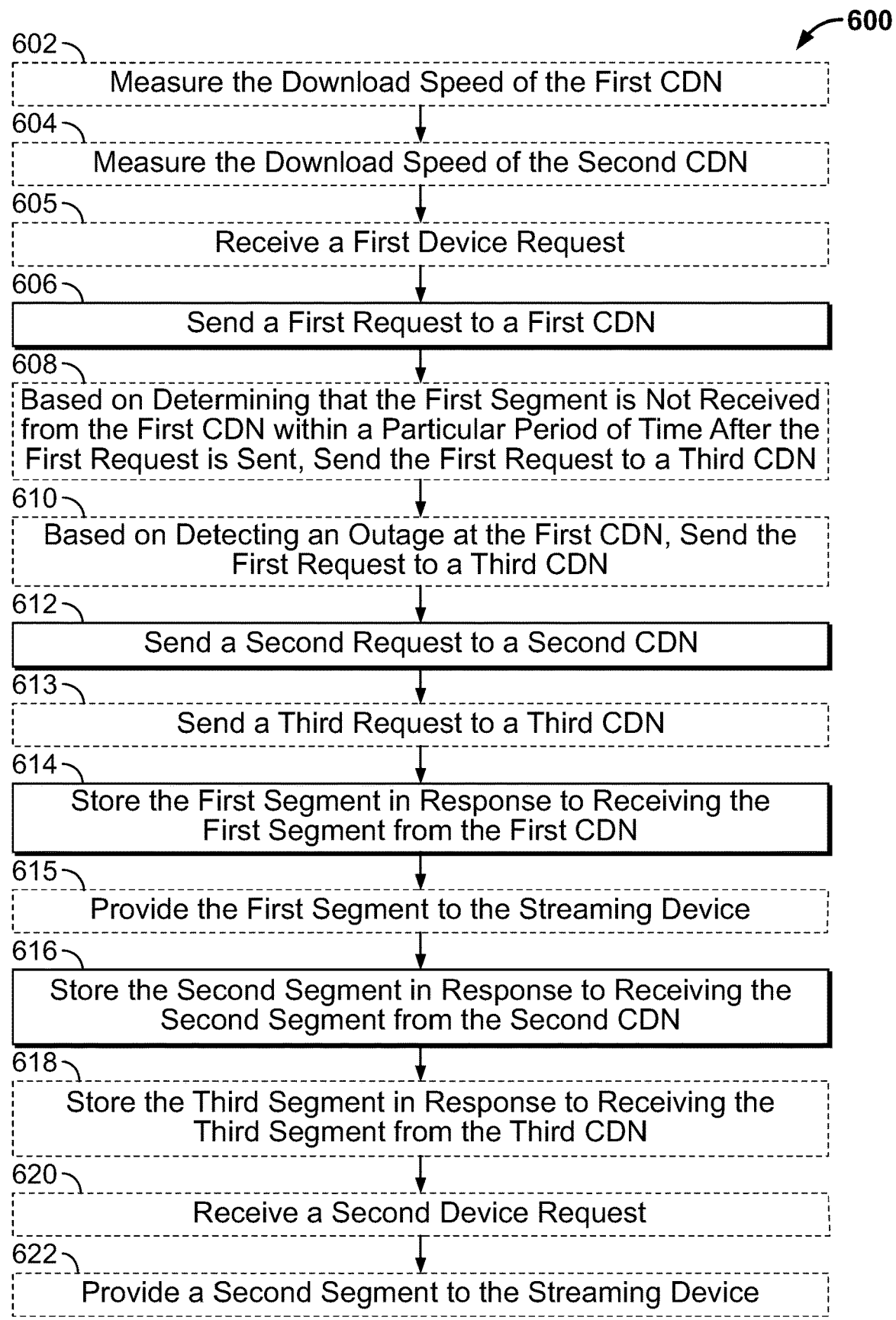
FIG. 6 illustrates a flowchart of a method of streaming multimedia content by a streaming device according to at least one embodiment.

FIG. 6 illustrates a flowchart of a method 600 of streaming multimedia content by a streaming device according to at least one embodiment.

At block 602, a download speed of a first CDN may be measured. For example, with reference to FIG. 4A (or FIG. 4B), a download speed of CDN 412-1 may be measured by the streaming device 402 (or the intermediate layer 403).

At block 604, a download speed of a second CDN may be measured. For example, with reference to FIG. 4A (or FIG. 4B), a download speed of CDN 412-2 may be measured by the streaming device 402 (or the intermediate layer 403).

At block 605, a first device request may be received. For example, with reference to FIG. 4B, the intermediate layer 403 receives a request from the streaming device 422 for download of segment 312 of FIG. 3A.

At block 606, a first request is sent to a first CDN of a plurality of CDNs. The first request is for requesting download of a first segment of the multimedia content, for streaming by the streaming device.

For example, with reference to FIG. 4A (or FIG. 4B), the streaming device 402 (or the intermediate layer 403) sends, to CDN 412-1, a request for download of segment 312.

At block 608, it may be determined that the first segment is not received from the first CDN within a particular period of time after the first request is sent. Based on such a determination, the streaming device may send the first request to a third CDN of the plurality of CDNs.

For example, with reference to FIG. 4A (or FIG. 4B), the streaming device 402 (or the intermediate layer 403) may send, to CDN 412-2, 412-3, 412-4 or 412-n, a request for download of the segment 312.

At block 610, an outage at the first CDN may be detected. Based on such an outage detection, the streaming device may send the first request to a third CDN of the plurality of CDNs.

For example, with reference to FIG. 4A (or FIG. 4B), the streaming device 402 (or the intermediate layer 403) may send, to CDN 412-2, 412-3, 412-4 or 412-n, a request for download of the segment 312.

At block 612, the streaming device sends a second request to a second CDN of the plurality of CDNs. The second request is for requesting download of a second segment of the multimedia content, for streaming by the streaming device.

For example, with reference to FIG. 4A (or FIG. 4B), the streaming device 402 (or the intermediate layer 403) sends, to CDN 412-2, a request for download of segment 314.

In at least one further embodiment, the first request and the second request are sent sequentially as a batch of requests.

In at least one further embodiment, the second segment is for streaming by the streaming device sequentially after the first segment. In this regard, the second request may be sent to the second CDN after the first request is sent to the first CDN, based on a download speed of the first CDN (for example, the download speed measured at block 602) being faster than a download speed of the second CDN (for example, the download speed measured at block 604).

In at least one further embodiment, a percentage of requests sent (by the streaming device 402 or by the intermediate layer 403) to the first CDN is based on routing information. Such routing information may indicate the percentage of requests that are to be sent to the first CDN. Alternatively (or in addition), a percentage of requests sent (by the streaming device 402 or by the intermediate layer 403) to the second CDN is based on the routing information. Such routing information may indicate the percentage of requests that are to be sent to the second CDN.

In at least one further embodiment, the streaming device is coupled to a connection provided by an ISP. Based on determining that the download speed of the first CDN is less than the download speed of the ISP, the streaming device may send the second request to the second CDN. For example, based on determining that the download speed of the CDN 412-1 is less than the download speed of the ISP, the streaming device 402 (or the intermediate layer 403) may send, to the CDN 412-2, the request for download of segment 314.

At block 613, a third request is sent to a third CDN of the plurality of CDNs. The third request is for requesting download of a third segment of the multimedia content, for streaming by the streaming device.

For example, with reference to FIG. 4A (or FIG. 4B), the streaming device 402 (or the intermediate layer 403) sends, to CDN 412-3, a request for download of segment 316.

At block 614, the first segment is stored in response to receiving the first segment from the first CDN, and the network speed for downloading from the first CDN is updated based on size of the downloaded fragment and the elapsed time. The network speed update might take previously measured network speeds into consideration.

For example, with reference to FIG. 4A (or FIG. 4B), the streaming device 402 (or the intermediate layer 403) stores segment 312 in response to receiving the segment 312 from the CDN 412-1. The segment 312 may be stored at cache 404-1 (or cache 414-1).

At block 615, the first segment may be provided to the streaming device.

For example, with reference to FIG. 4B, the intermediate layer 403 may provide the segment 312 (stored at the cache 414-1) to the streaming device 422 in response to the first device request received at block 605.

At block 616, the second segment is stored in response to receiving the second segment from the second CDN, and the network speed for downloading from the second CDN is updated based on size of the downloaded fragment and the elapsed time.

For example, with reference to FIG. 4A (or FIG. 4B), the streaming device 402 (or the intermediate layer 403) stores segment 314 in response to receiving the segment 314 from the CDN 412-2. The segment 314 may be stored at cache 404-2 (or cache 414-2).

At block 618, the third segment is stored in response to receiving the third segment from the third CDN, and the network speed for downloading from the third CDN is updated based on size of the downloaded fragment and the elapsed time.

For example, with reference to FIG. 4A (or FIG. 4B), the streaming device 402 (or the intermediate layer 403) stores segment 316 in response to receiving the segment 316 from the CDN 412-3. The segment 316 may be stored at cache 404-3 (or cache 414-3).

At block 620, a second device request may be received. For example, with reference to FIG. 4B, the intermediate layer 403 receives a request from the streaming device 422 for download of segment 314 of FIG. 3A.

At block 622, the second segment may be provided to the streaming device.

For example, with reference to FIG. 4B, the intermediate layer 403 may provide the segment 314 (stored at the cache 414-2) to the streaming device 422 in response to the second device request received at block 620.

As previously described, in at least some embodiments, the user device 102, the content server, the web servers, or other aspects of the described environment (for example, environment 100 of FIG. 1A, the streaming device 402 of FIG. 4A, the streaming device 422 of FIG. 4B, the intermediate layer 403 of FIG. 4B) may include one or more software or hardware computer systems and may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

The components of various embodiments described herein may each include a hardware processor of the one or more computer systems, and, in one embodiment, a single processor may be configured to implement the various components. For example, in one embodiment, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 7:
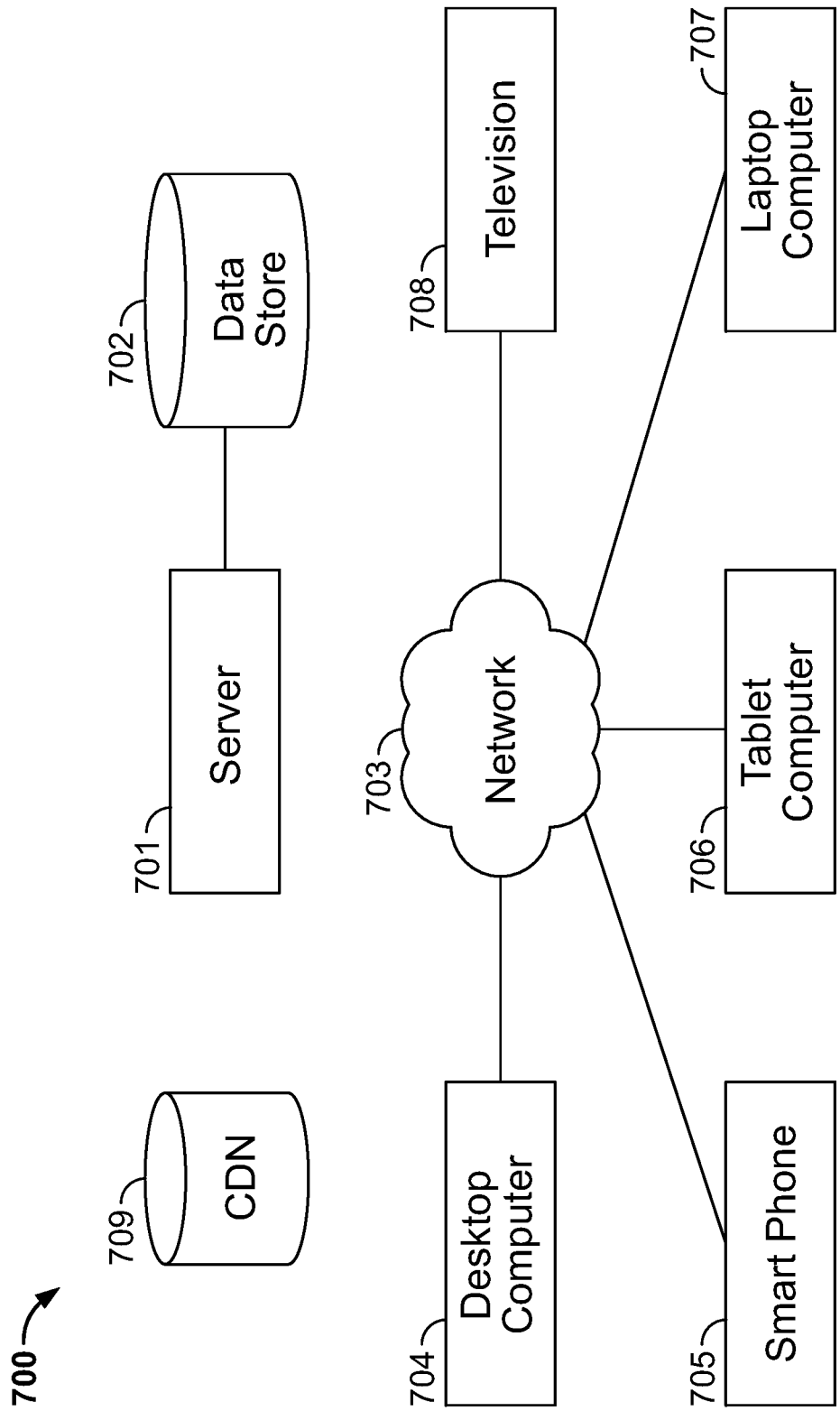
FIG. 7 is an illustration of a computing environment according to at least one embodiment.

In selected embodiments, features and aspects described herein may be implemented within a computing environment 700, as shown in FIG. 7, which may include one or more computer servers 701. The server 701 may be operatively coupled to one or more data stores 702 (for example, databases, indexes, files, or other data structures). The server 701 may connect to a data communication network 703 including a local area network (LAN), a wide area network (WAN) (for example, the Internet), a telephone network, a satellite or wireless communication network, or some combination of these or similar networks.

One or more client devices 704, 705, 706, 707, 708 may be in communication with the server 701, and a corresponding data store 702 via the data communication network 703. Such client devices 704, 705, 706, 707, 708 may include, for example, one or more laptop computers 707, desktop computers 704, smartphones and mobile phones 705, tablet computers 706, televisions 708, or combinations thereof. In operation, such client devices 704, 705, 706, 707, 708 may send and receive data or instructions to or from the server 701 in response to user input received from user input devices or other input. In response, the server 701 may serve data from the data store 702, alter data within the data store 702, add data to the data store 702, or the like, or combinations thereof.

In selected embodiments, the server 701 may transmit one or more media files including audio and/or video content, encoded data, generated data, and/or metadata from the data store 702 to one or more of the client devices 704, 705, 706, 707, 708 via the data communication network 703. Also, such files may be transmitted from a CDN 709 to one or more of the client devices 704, 705, 706, 707, 708 via the data communication network 703. The devices may output the audio and/or video content from the media file using a display screen, projector, or other display output device. In certain embodiments, the system 700 configured in accordance with features and aspects described herein may be configured to operate within or support a cloud computing environment. For example, a portion of, or all of, the data store 702 and server 701 may reside in a cloud server.

Figure 8:
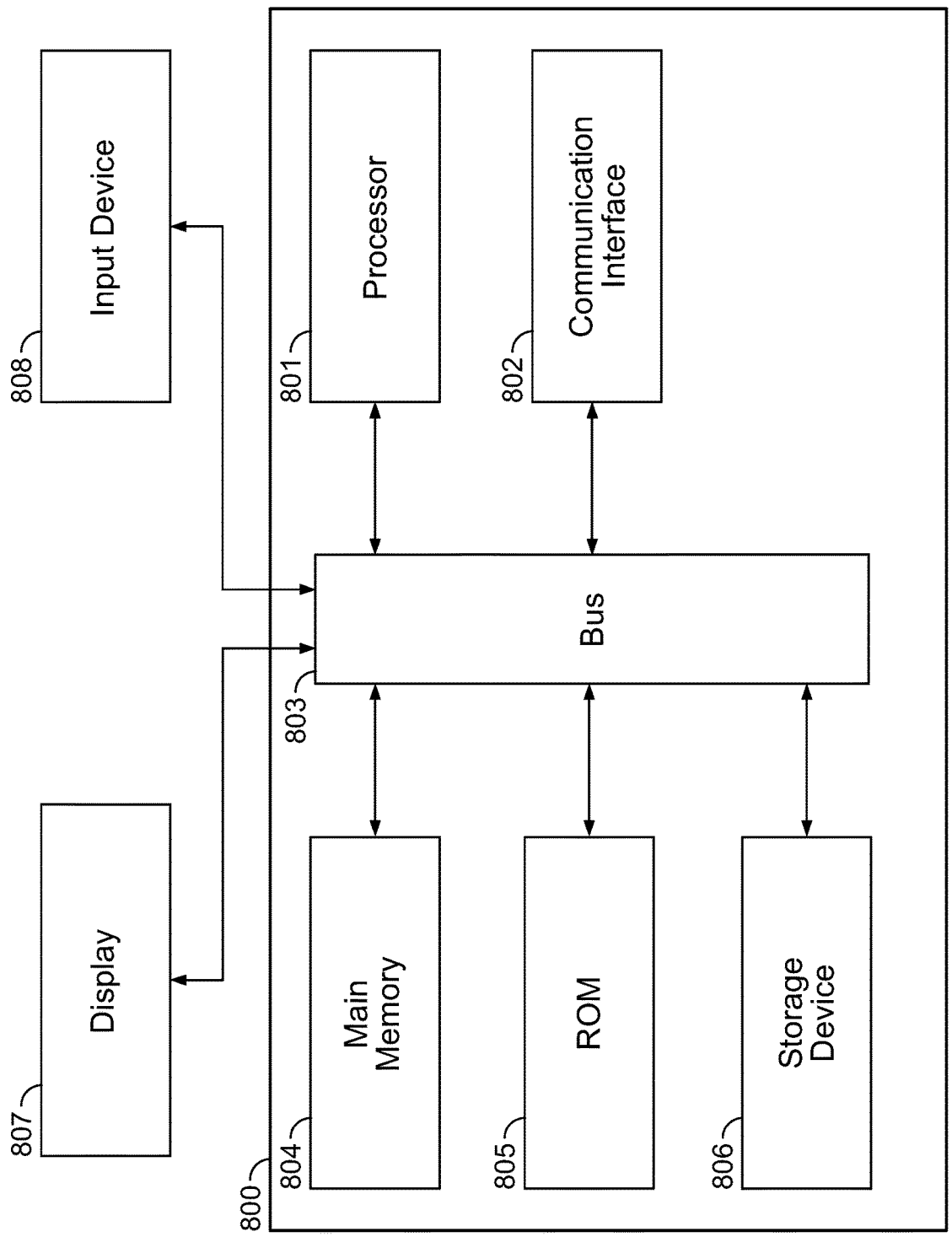
FIG. 8 is a block diagram of a device according to at least one embodiment.

With reference to FIG. 8, an illustration of an example computer 800 is provided. One or more of the devices 704, 705, 706, 707, 708 of the system 700 may be configured as or include such a computer 800. In addition, one or more components of the environment 100 of FIG. 1A and/or the streaming device 402 of FIG. 4A and/or the streaming device 422 of FIG. 4B may be configured as or include the computer 800.

In selected embodiments, the computer 800 may include a bus 803 (or multiple buses) or other communication mechanism, a processor 801, main memory 804, read only memory (ROM) 805, one or more additional storage devices 806, and/or a communication interface 802, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 803 or other communication mechanism, including multiple such buses or mechanisms, may support communication of information within the computer 800. The processor 801 may be connected to the bus 803 and process information. In selected embodiments, the processor 801 may be a specialized or dedicated microprocessor configured to perform particular tasks in accordance with the features and aspects described herein by executing machine-readable software code defining the particular tasks. Main memory 804 (for example, random access memory—or RAM—or other dynamic storage device) may be connected to the bus 803 and store information and instructions to be executed by the processor 801. Main memory 804 may also store temporary variables or other intermediate information during execution of such instructions.

ROM 805 or some other static storage device may be connected to a bus 803 and store static information and instructions for the processor 801. The additional storage device 806 (for example, a magnetic disk, optical disk, memory card, or the like) may be connected to the bus 803. The main memory 804, ROM 805, and the additional storage device 806 may include a non-transitory computer-readable medium holding information, instructions, or some combination thereof—for example, instructions that, when executed by the processor 801, cause the computer 800 to perform one or more operations of a method as described herein. The communication interface 802 may also be connected to the bus 803. A communication interface 802 may provide or support two-way data communication between the computer 800 and one or more external devices (for example, other devices contained within the computing environment).

In selected embodiments, the computer 800 may be connected (for example, via the bus 803) to a display 807. The display 807 may use any suitable mechanism to communicate information to a user of a computer 800. For example, the display 807 may include or utilize a liquid crystal display (LCD), light emitting diode (LED) display, projector, or other display device to present information to a user of the computer 800 in a visual display. One or more input devices 808 (for example, an alphanumeric keyboard, mouse, microphone) may be connected to the bus 803 to communicate information and commands to the computer 800. In selected embodiments, one input device 808 may provide or support control over the positioning of a cursor to allow for selection and execution of various objects, files, programs, and the like provided by the computer 800 and displayed by the display 807.

The computer 800 may be used to transmit, receive, decode, display, etc. one or more video files. In selected embodiments, such transmitting, receiving, decoding, and displaying may be in response to the processor 801 executing one or more sequences of one or more instructions contained in main memory 804. Such instructions may be read into main memory 804 from another non-transitory computer-readable medium (for example, a storage device).

Execution of sequences of instructions contained in main memory 804 may cause the processor 801 to perform one or more of the procedures or steps described herein. In selected embodiments, one or more processors in a multi-processing arrangement may also be employed to execute sequences of instructions contained in main memory 804. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 801, or that stores data for processing by a computer, and include all computer-readable media, with the sole exception being a transitory, propagating signal. Such a non-transitory computer readable medium may include, but is not limited to, non-volatile media, volatile media, and temporary storage media (for example, cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 802 may provide or support external, two-way data communication to or via a network link. For example, the communication interface 802 may be a wireless network interface controller or a cellular radio providing a data communication network connection. Alternatively, the communication interface 802 may include a LAN card providing a data communication connection to a compatible LAN. In any such embodiment, the communication interface 802 may send and receive electrical, electromagnetic, or optical signals conveying information.

A network link may provide data communication through one or more networks to other data devices (for example, client devices as shown in the computing environment 700). For example, a network link may provide a connection through a local network of a host computer or to data equipment operated by an Internet Service Provider (ISP). An ISP may, in turn, provide data communication services through the Internet. Accordingly, a computer 800 may send and receive commands, data, or combinations thereof, including program code, through one or more networks, a network link, and communication interface 802. Thus, the computer 800 may interface or otherwise communicate with a remote server (for example, server 701), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for streaming multimedia content by a streaming device, the method comprising:
sending a first request to a first content distribution network (CDN) of a plurality of CDNs, the first request for requesting download of a first segment of the multimedia content for streaming by the streaming device;
sending a second request to a second CDN of the plurality of CDNs, the second request for requesting download of a second segment of the multimedia content for streaming by the streaming device;
storing the first segment in response to receiving the first segment from the first CDN; and
storing the second segment in response to receiving the second segment from the second CDN,
wherein:
the first segment is stored at a first cache in response to receiving the first segment from the first CDN; and
the second segment is stored at a second cache in response to receiving the second segment from the second CDN, and
wherein:
the streaming device is coupled to a connection provided by an Internet service provider (ISP); and
based on determining that a download speed of the first CDN is less than a download speed of the ISP, the second request is sent to the second CDN.

2. The method of claim 1, wherein the first request and the second request are sent sequentially as a batch of requests.

3. The method of claim 1, wherein the first request and the second request are sent concurrently as a batch of requests.

4. The method of claim 1, further comprising sending additional requests to CDNs until the content has been received in entirety by the streaming device, wherein the additional requests are sent sequentially or concurrently as one or more batches of requests.

5. The method of claim 1, wherein:
the second segment is for streaming by the streaming device sequentially after the first segment; and
the second request is sent to the second CDN after the first request is sent to the first CDN, based on the download speed of the first CDN being faster than a download speed of the second CDN.

6. The method of claim 5, further comprising:
measuring the download speed of the first CDN; and
measuring the download speed of the second CDN.

7. The method of claim 1, further comprising:
based on determining that the first segment is not received from the first CDN within a particular period of time after the first request is sent, sending the first request to a third CDN of the plurality of CDNs.

8. The method of claim 1, further comprising:
based on detecting an outage at the first CDN, sending the first request to a third CDN of the plurality of CDNs.

9. The method of claim 1,
wherein a percentage of requests sent to the first CDN is based on routing information, and
wherein a percentage of requests sent to the second CDN is based on the routing information.

10. The method of claim 1, further comprising:
receiving, from the streaming device, a first device request for requesting download of the first segment,
wherein the first request and the second request are sent to the first CDN and the second CDN, respectively, by an intermediate layer in response to receiving the first device request; and
providing the stored first segment to the streaming device in further response to receiving the first device request.

11. The method of claim 10, further comprising:
receiving, from the streaming device, a second device request for requesting download of the second segment; and
providing the stored second segment to the streaming device in response to receiving the second device request.

12. The method of claim 1, further comprising:
sending a third request to a third CDN of the plurality of CDNs, the third request for requesting download of a third segment of the multimedia content for streaming by the streaming device; and
storing the third segment in response to receiving the third segment from the third CDN.

13. A machine-readable non-transitory medium having stored thereon machine-executable instructions for streaming multimedia content by a streaming device, the instructions comprising:
sending a first request to a first content distribution network (CDN) of a plurality of CDNs, the first request for requesting download of a first segment of the multimedia content for streaming by the streaming device;
sending a second request to a second CDN of the plurality of CDNs, the second request for requesting download of a second segment of the multimedia content for streaming by the streaming device;
storing the first segment in response to receiving the first segment from the first CDN; and
storing the second segment in response to receiving the second segment from the second CDN,
wherein:
the first segment is stored at a first cache in response to receiving the first segment from the first CDN; and
the second segment is stored at a second cache in response to receiving the second segment from the second CDN, and
wherein:
the streaming device is coupled to a connection provided by an Internet service provider (ISP); and
based on determining that a download speed of the first CDN is less than a download speed of the ISP, the second request is sent to the second CDN.

14. The machine-readable non-transitory medium of claim 13, wherein:
the second segment is for streaming by the streaming device sequentially after the first segment; and
the second request is sent to the second CDN after the first request is sent to the first CDN, based on the download speed of the first CDN being faster than a download speed of the second CDN.

15. The machine-readable non-transitory medium of claim 13,
wherein a percentage of requests sent to the first CDN is based on routing information, and
wherein a percentage of requests sent to the second CDN is based on the routing information.

16. The machine-readable non-transitory medium of claim 13, wherein the instructions further comprise:
receiving, from the streaming device, a first device request for requesting download of the first segment,
wherein the first request and the second request are sent to the first CDN and the second CDN, respectively, in response to receiving the first device request;
providing the stored first segment to the streaming device in further response to receiving the first device request;
receiving, from the streaming device, a second device request for requesting download of the second segment; and
providing the stored second segment to the streaming device in response to receiving the second device request.

17. An apparatus for streaming multimedia content, the apparatus comprising:
a network communication unit configured to transmit and receive data; and
one or more controllers configured to:
send a first request to a first content distribution network (CDN) of a plurality of CDNs, the first request for requesting download of a first segment of the multimedia content for streaming by the apparatus;
send a second request to a second CDN of the plurality of CDNs, the second request for requesting download of a second segment of the multimedia content for streaming by the apparatus;
store the first segment in response to receiving the first segment from the first CDN; and
store the second segment in response to receiving the second segment from the second CDN,
wherein:
the first segment is stored at a first cache in response to receiving the first segment from the first CDN; and
the second segment is stored at a second cache in response to receiving the second segment from the second CDN, and
wherein:
the apparatus is coupled to a connection provided by an Internet service provider (ISP); and
based on determining that a download speed of the first CDN is less than a download speed of the ISP, the second request is sent to the second CDN.

* * * * *